United States Patent
Someshwar

(10) Patent No.: US 9,134,935 B2
(45) Date of Patent: Sep. 15, 2015

(54) METHODS AND APPARATUS FOR SECURE DOCUMENT PRINTING

(71) Applicant: ELECTRONICS FOR IMAGING, INC., Fremont, CA (US)

(72) Inventor: Ravi Someshwar, Redwood City, CA (US)

(73) Assignee: Electronics for Imaging, Inc., Fremont, CA (US)

( * ) Notice: Subject to any disclaimer, the term of this patent is extended or adjusted under 35 U.S.C. 154(b) by 0 days.

(21) Appl. No.: 14/328,539

(22) Filed: Jul. 10, 2014

(65) Prior Publication Data
US 2014/0320889 A1    Oct. 30, 2014

Related U.S. Application Data

(60) Continuation of application No. 14/076,962, filed on Nov. 11, 2013, now Pat. No. 8,782,808, which is a continuation of application No. 12/110,329, filed on Apr. 27, 2008, now Pat. No. 8,601,605, which is a division of application No. 10/317,448, filed on Dec. 11, 2002, now Pat. No. 7,367,060.

(51) Int. Cl.
| | |
|---|---|
| *G06F 3/12* | (2006.01) |
| *G06K 15/00* | (2006.01) |
| *G06F 21/60* | (2013.01) |
| *H04L 29/06* | (2006.01) |

(52) U.S. Cl.
CPC ............ *G06F 3/1222* (2013.01); *G06F 3/1238* (2013.01); *G06F 3/1288* (2013.01); *G06F 21/608* (2013.01); *H04L 63/0227* (2013.01); *H04L 63/0428* (2013.01); *H04L 63/10* (2013.01); *G06K 15/4095* (2013.01)

(58) Field of Classification Search
None
See application file for complete search history.

(56) References Cited

U.S. PATENT DOCUMENTS

| | | |
|---|---|---|
| 5,629,980 A | 5/1997 | Stefik et al. |
| 6,233,684 B1 | 5/2001 | Stefik et al. |
| 6,314,521 B1 | 11/2001 | Debry |
| 6,378,070 B1 | 4/2002 | Chan et al. |
| 6,675,212 B1 * | 1/2004 | Greenwood ................. 709/224 |
| 6,829,707 B1 | 12/2004 | Marshall et al. |
| 6,886,028 B1 | 4/2005 | Matsuyama et al. |

(Continued)

OTHER PUBLICATIONS

Kohl, et al., "Security for the Digital Library Protecting Documents Rather Than Channels", IBM Research Division; Aug. 1998; San Jose, CA.

*Primary Examiner* — King Poon
*Assistant Examiner* — Vincent Peren
(74) *Attorney, Agent, or Firm* — Michael A. Glenn; Perkins Coie LLP

(57) ABSTRACT

A secure document printing system is provided. A policy server is used to define access rules for a document, and select individual users and/or groups that will have access to the document. The policy server stores the access rules along with a document decryption key. The policy server's name and address are packed in the document, and then encrypted and sent to a print server which stores it for later access. A recipient is notified that the document resides on a particular print server. The print server retrieves the specified document, contacts the policy server named in the document, and requests the document decryption key and access rules for the user, print server, and document from the policy server which replies with the related decryption key and access rules. The print server decrypts the document and prints the document based on the access rules.

20 Claims, 5 Drawing Sheets

(56) References Cited

U.S. PATENT DOCUMENTS

| | | |
|---|---|---|
| 6,934,693 B2 | 8/2005 | Stefik et al. |
| 6,996,235 B2 | 2/2006 | Foth |
| 7,180,621 B2 | 2/2007 | Clough et al. |
| 7,210,039 B2 | 4/2007 | Rodgers |
| 7,272,625 B1 | 9/2007 | Hannel et al. |
| 7,333,616 B1 | 2/2008 | Brettle et al. |
| 2001/0008557 A1 | 7/2001 | Stefik et al. |
| 2002/0007456 A1* | 1/2002 | Peinado et al. ............... 713/164 |
| 2002/0029340 A1 | 3/2002 | Pensak et al. |
| 2002/0042884 A1 | 4/2002 | Wu et al. |
| 2002/0048369 A1 | 4/2002 | Ginter et al. |
| 2002/0077986 A1 | 6/2002 | Kobata et al. |
| 2002/0078361 A1 | 6/2002 | Giroux et al. |
| 2002/0083114 A1* | 6/2002 | Mazzagatte et al. .......... 709/100 |
| 2002/0154332 A1* | 10/2002 | Inai et al. .................... 358/1.15 |
| 2002/0154558 A1 | 10/2002 | Urata et al. |
| 2002/0169002 A1 | 11/2002 | Imbrie et al. |
| 2002/0186398 A1 | 12/2002 | Ono et al. |
| 2003/0009672 A1 | 1/2003 | Goodman |
| 2003/0044009 A1 | 3/2003 | Dathathraya |
| 2003/0079134 A1 | 4/2003 | Manchala et al. |
| 2003/0099353 A1 | 5/2003 | Goh et al. |
| 2003/0187801 A1 | 10/2003 | Chase, Jr. et al. |
| 2005/0273852 A1 | 12/2005 | Ferlitsch |
| 2007/0100837 A1 | 5/2007 | Martin |

* cited by examiner

METHODS AND APPARATUS FOR SECURE DOCUMENT PRINTING

REFERENCE TO RELATED APPLICATIONS

This application is a continuation of U.S. patent application Ser. No. 14/076,962, filed Nov. 11, 2013, which is a continuation of U.S. patent application Ser. No. 12/110,329, filed Apr. 27, 2008, now U.S. Pat. No. 8,601,605, which is a divisional of U.S. patent application Ser. No. 10/317,448, filed 11 Dec. 2002, now U.S. Pat. No. 7,367,060, each of which is incorporated by reference herein in its entirety.

BACKGROUND

The invention relates to the printing of documents in a computer environment. More particularly, the invention relates to the secure printing of documents in a networked printer environment.

Referring to FIG. 1, the way users print documents has remained fairly standard among the years. Not much has changed in the procedure of the user obtaining a document at a computer 101 and sending the document across a network or other type of connection 102 to a printer 103 for printing. The printer 103 prints the document which the user eventually retrieves.

With respect to FIG. 2, the user 201 also prints documents through a server 202, such as a document server or print server. When a document server 202 is used, the user 201 selects a document resident on the server 202 for printing. The server 202 connects to the printer 203 and sends the document to be printed to the printer 203 which prints the document.

A print server 202 acts as an intermediary between the user 201 and the printer 203. The print server 202 receives a document from the user 201, processes or rasterizes the document, and sends it to the printer 203. The printer 203 receives the processed or rasterized document and prints the document.

Printing documents in a secure environment has typically been performed using the document server approach. A user accesses a document on the document server and attempts to print it. The document server checks to see if the user has permission to print the document and, if the user does have permission, sends the document to the appropriate printer.

The document permission parameters used by the document server are set by the document creator or system administrator.

However, this approach requires that the document server send documents to a printer over an open network, leaving the server/printer connection insecure. Further, the document permission parameters are set for the entire document without any further granularity, e.g., on a per page basis.

It would be advantageous to provide a secure document printing system that provides for the secure transportation of documents throughout a network. It would further be advantageous to provide a secure document printing system that allows document creators to define access rules for a document on a per page basis.

SUMMARY

The invention provides a secure document printing system. The system provides a secure document transport and storage mechanism in a computer network. In addition, the invention provides a system that allows document creators to define access rules for a document on a per page basis.

A preferred embodiment of the invention provides a secure transport and printing environment. A user creates a document using any application program. The invention provides a policy server that the user logs onto to define access rules for the document. The user selects individual users and/or groups that may have access to the document, defines access rules for each user or group, and specifies printing restrictions for the entire document or certain pages. Access rules that have been defined for the document are assembled by the policy server which stores them locally along with a document decryption key. The policy server is network accessible to allow the user to change the access rules for a document throughout the lifetime of the document.

The user's computer packages the policy server's name and address into the document and encrypts the document. The user selects a print server provided by the invention and sends the encrypted document to the print server which stores the encrypted document on its local storage for later access.

A receiving user is notified that the document resides on a particular print server via email, for example. When the receiving user wants to print the document, the receiving user logs onto the print server. The print server retrieves the specified document, contacts the policy server named in the document, and requests the document decryption key and access rules for the user, print server, and document from the policy server. The policy server sends the related decryption key and access rules to the print server.

The print server decrypts the document using the decryption key and then prints the document based on the document or page-level access rules by sending the printable pages to the printer. If the user or print server does not have the proper access rights to print the document, then the user will be notified that the document is not printable.

Another preferred embodiment of the invention provides the print server functionality in a user's networked computer.

Yet another preferred embodiment of the invention allows users to receive encrypted documents from other users. The receiving user sends a print request to one of the invention's print servers. The print server retrieves the encrypted document from the receiving user's computer and performs the functions described above.

DETAILED DESCRIPTION

The invention is embodied in secure document printing system in a computer environment. A system according to the invention provides a secure document transport and storage mechanism in a computer network. In addition, the invention provides a system that allows document creators to define access rules for a document on a per page basis.

The invention provides a system that allows users to securely transmit documents to a printer and have full control over who can access and print the document at the printer. The document creator is given full control over the printing accessibility of each page in the document for groups and individual users.

Other approaches allow users to encrypt documents and send the encrypted documents to a printer. The printer decrypts the documents and prints the entire document. The invention offers a distinct advantage over the prior art by providing an encryption key and access rights external from the printer and independent from the transmission path of the actual encrypted file. This offers a more secure environment where a different encryption key can be used for each individual document. Additionally, the document creator has the ability to define access rights for the entire document as well as at the page level.

Figure 1:
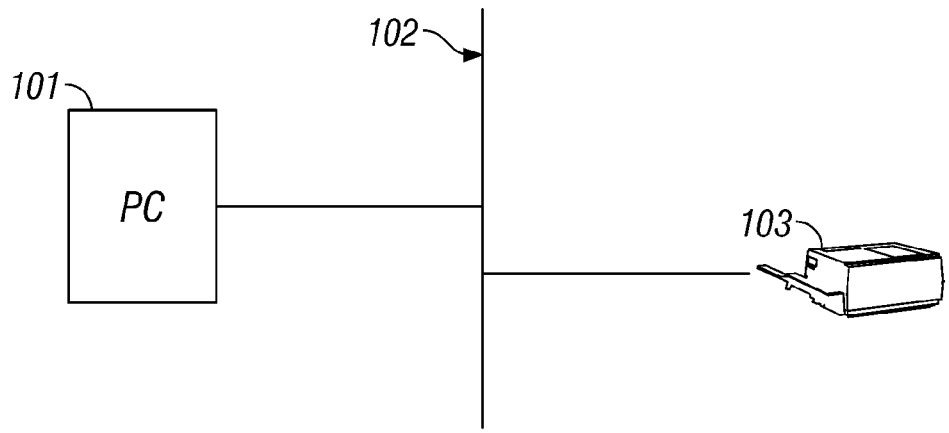
FIG. 1 is a block schematic diagram showing a prior art approach of printing a document across a network according to the invention.
Figure 2:
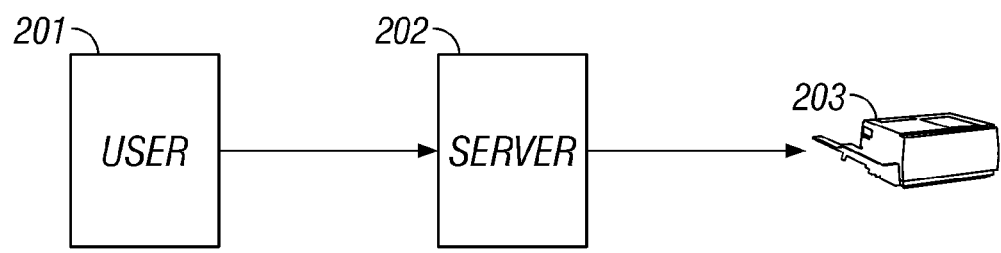
FIG. 2 is a block schematic diagram showing a prior art approach of printing a document through a print server according to the invention.
Figure 3:
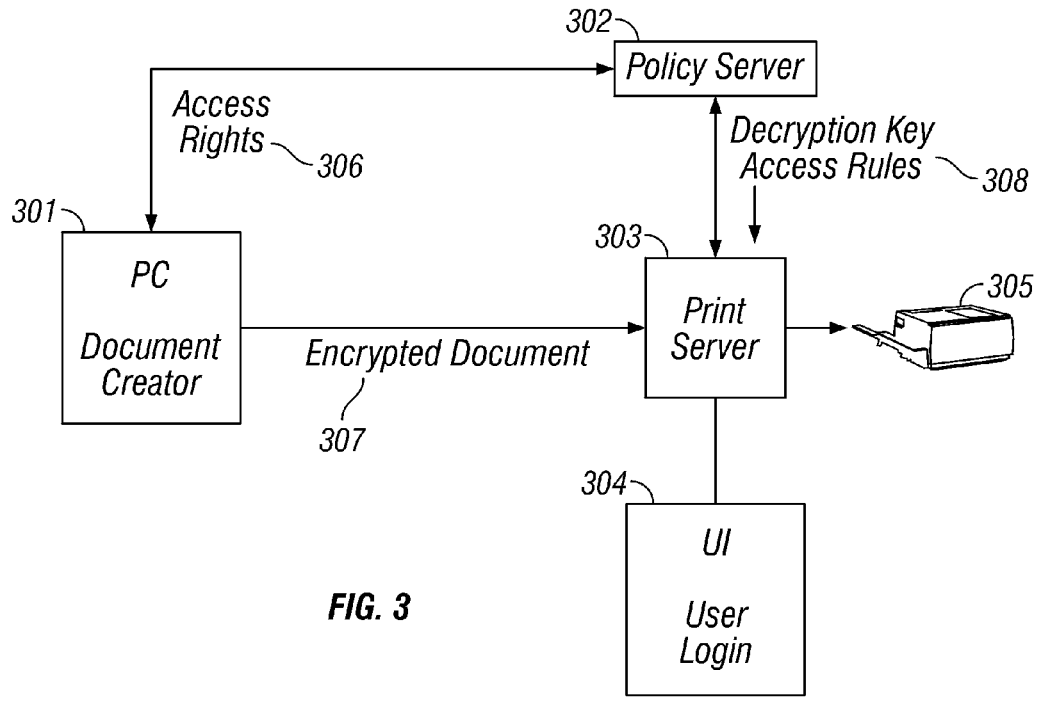
FIG. 3 is a block schematic diagram of a preferred embodiment of the invention using a policy server and a print server to perform secure document printing according to the invention.

Referring to FIG. 3, a preferred embodiment of the invention is shown. A user produces a document on a computer 301. The document can be created using any application program. The user then logs onto the policy server 302 and designates the document to be a secure document. The user then selects individual users and/or groups that may have access to the document. Access rules are defined for each user or group that is given access to the document. The user specifies if there are printing restrictions to the entire document or certain pages. For example, if the user has a document that is 100 pages, he can give access to certain pages to certain users.

The policy server 302 assembles the access rules 306 that have been defined for the document and stores them on a local storage device along with a document decryption key. Access rules contain information such as: the user list (groups, individuals); the access rules for each entry in the user list, e.g., cannot print after Dec. 2, 2010, can only print two times, unlimited printing, etc.; and the scope of each rule, e.g., all of the document, specific page of document, range of pages of document. For example, document X has 100 pages, only page five is printable before Dec. 2, 2010 by user A and can only be printed two times. The policy server 302 is network accessible to allow the user to change the access rules for a document once it leaves the computer 301. The user logs onto the policy server 302 and changes the access rules for the document. The invention thereby allows the user to have control over the print access rules of the document for the lifetime of the document.

The user's computer 301 packages the policy server's name and address into the document and encrypts the document. The user selects the desired print server 303 and sends the encrypted document 307 to the print server 303. Print server 303 stores the encrypted document on its local storage for later access. The document can also be sent to the print server 303 on a one-time basis for printing.

A receiving user is notified that the document resides on a particular print server 303 via email, for example. When the receiving user wants to print the document, the receiving user logs onto the print server 303 through the print server's user interface 304. The print server 303 either lists the files that are resident on its local storage and allows the receiving user to select the desired document or has the receiving user type in the name of the document. If the print server does not have the document that the user is interested in, then it may be resident in another print server in the network.

The print server 303 retrieves the specified document and contacts the policy server 302 named in the document. The print server 303 requests the document decryption key and access rules for the user and document, e.g. using a document ID, from the policy server 302. The policy server 302 references the document, user, and print server 303 IDs to retrieve the decryption key and access rules for the document, and sends the related decryption key and access rules 308 to the print server 303.

The print server 303 receives the decryption key and access rules from the policy server 302. The document is decrypted by the print server 303 using the decryption key. It then prints the document based on the document or page-level access rules by sending the printable pages to the printer 305. If the user or print server 303 does not have the proper access rights to print the document, then the user is notified that the document is not printable.

Figure 4:
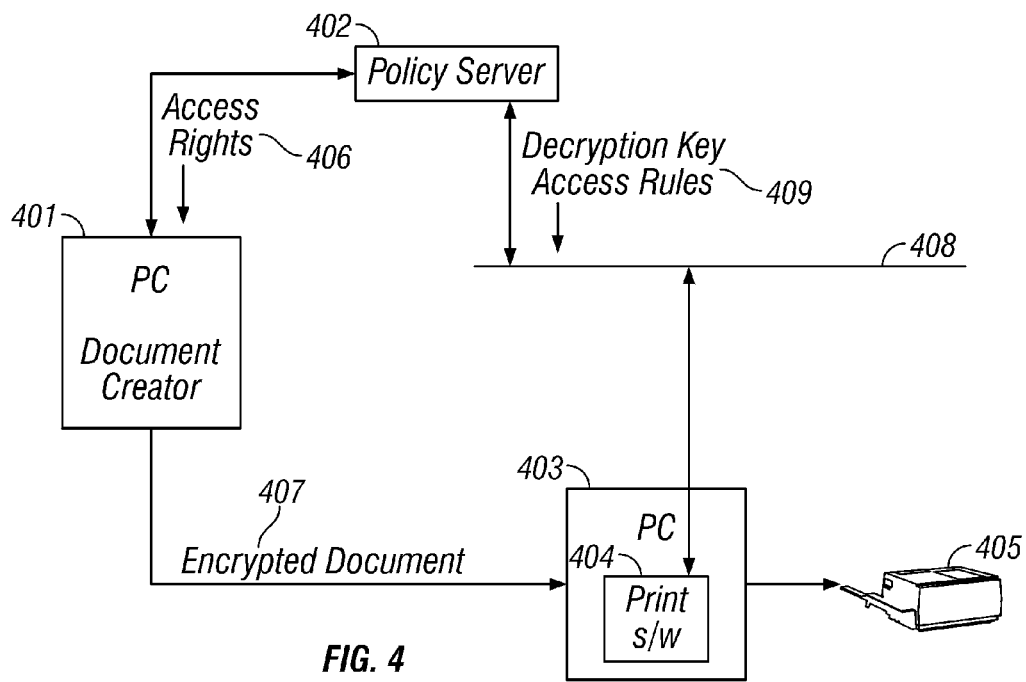
FIG. 4 is a block schematic diagram of a preferred embodiment of the invention using a receiving user's computer and a policy server to perform secure document printing according to the invention.

With respect to FIG. 4, another embodiment of the invention provides a computer 403 that sits in front of a printer 405. The computer 403 accepts all encrypted documents 407 from document creators 401 destined for the printer 405. Printing software 404 stores the encrypted document on the computer's 403 local storage for later access.

A receiving user is notified that the document resides on a particular computer 403 via email, for example. When the receiving user wants to print the document, the receiving user logs onto the computer 403, accessing the printing software 404. The printing software 404 either lists the files that are resident on its local storage and allows the receiving user to select the desired document or has the receiving user type in the name of the document.

The printing software 404 retrieves the specified document and contacts the policy server 402 across the network, such as the Internet, using the IP address or URL contained in the document. The printing software 404 requests the decryption key and access rules for user and document, e.g. using a document ID, from the policy server 402. The policy server 402 references the document, user, and computer 403 IDs to retrieve the decryption key and access rules for the document, and sends the related decryption key and access rules 409 across the network 408 to the printing software 404.

The printing software 404 receives the decryption key and access rules from the policy server 402. The document is decrypted by the printing software 404 using the decryption key. The printing software 404 then prints the document based on the document or page-level access rule by sending the printable pages to the printer 405. If the user or computer 403 does not have the proper access rights to print the document, then the user is that the document is not printable.

This allows any printer to be used. The policy server 402 can keep track of which computers can print the document and it can also track which printer that the computer is connected to can print the document.

For example, an email with a document attached is sent to a user. The user accesses the email on his PC. The user clicks on the email attachment and indicates that he wants to print the document. The PC performs the print server functionality. All of the PC's print operations are changed to perform the decryption and access rule checks for any document.

Figure 5:
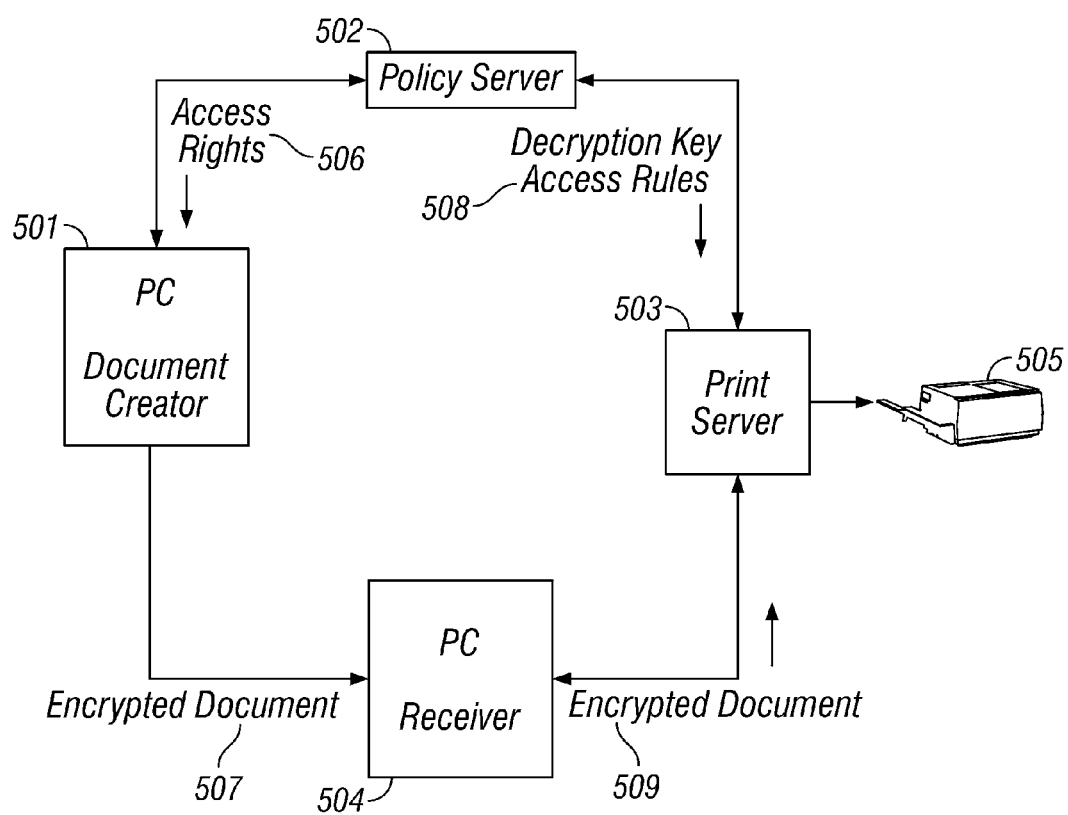
FIG. 5 is a block schematic diagram of a preferred embodiment of the invention using a receiving user's computer, a policy server, and a print server to perform secure document printing according to the invention.

Referring to FIG. 5, yet another preferred embodiment allows the originating user 501 to download an encrypted document 507 to a computer 504. The receiving user 504 then logs onto the print server 503 and tells the print server 503 that he wants to print a specific document. The print server 503 retrieves the encrypted document 509 from the computer 504 and contacts the policy server 502 named in the document. The print server 503 requests the decryption key and access rules for the user and document, e.g. using a document ID, from the policy server 502. The policy server 502 references the document, user, and print server 503 IDs to retrieve the decryption key and access rules for the document, and sends the related decryption key and access rules 508 to the print server 503.

The print server 503 receives the decryption key and access rules from the policy server 502. The document is decrypted by the print server 503 using the decryption key. It then prints the document based on the document or page-level access rule by sending the printable pages to the printer 505. If the user or print server 503 does not have the proper access rights to print the document, then the user is notified that the document is not printable.

This allows the invention to work in computer and printing systems anywhere in the world.

Figure 6:
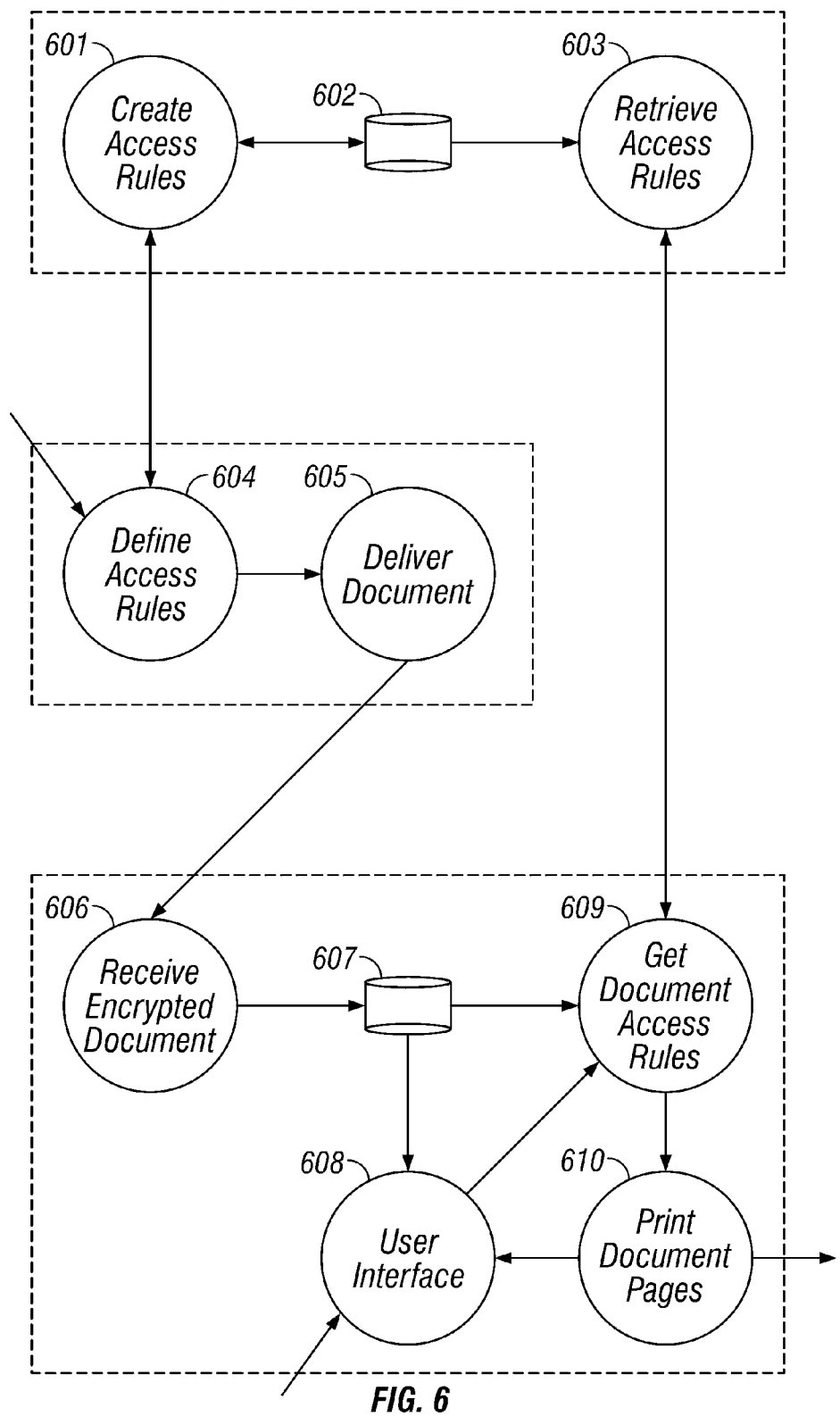
FIG. 6 is a block schematic diagram of a task viewpoint of a preferred embodiment of the invention showing the policy server and print server/receiving user's computer interactions according to the invention.

With respect to FIG. 6, a task viewpoint of a preferred embodiment the invention is shown. The user defines the access rules for a document through the Define Access Rules module 604. The Define Access Rules module 604 communicates with the Create Access Rules module 601 to create the access rules for the document. The user selects individual users and/or groups that may have access to the document. He defines access rules for each user or group that is given access to the document. The user also specifies if there are printing restrictions to the entire document or certain pages and, if desired, the print servers and/or computers that are allowed to perform the print process. The Create Access Rules module 601 stores the document's access rules in its local storage 602. The access rules for the document can always be modified by the user through the Define Access Rules module 604 and the Create Access Rules module 601 during the lifetime of the document.

When the user is ready to send the document to another computer or print server, the Deliver Document module 605 encrypts the document, inserts the policy server's name, IP address, or URL address into the document, and sends the package to the destination.

The Receive Encrypted Document module 606 receives encrypted documents and places them in local storage 607 for later access and printing. The receiving user accesses the documents stored on the computer or print server through the User Interface module 608. The receiving user logs into the User Interface module 608 which either displays all of the documents that are available to that user, allowing the user to select the desired document, or has the user enter the desired document's name. The Get Document Access Rules module 609 gathers the document ID from the local storage 607, print server or computer name or ID, and user name or ID and requests the access rules for the document from the Retrieve Access Rules module 603.

Access rules and the decryption key for the document are retrieved from local storage 602 by the Retrieve Access Rules module 603. The Retrieve Access Rules module 603 extracts the access rules for the receiving user and the print server or computer, e.g. a print server may not be in the group of print servers that are allowed to print the document, and sends the access rules and decryption key to the Get Document Access Rules module 609.

The access rules, decryption key, and document (from the local storage 607) are sent to the Print Document Pages module 610 by the Get Document Access Rules module 609. The Print Document Pages module 610 prints the document based on the document or page-level access rule by sending the printable pages to a printer. If the user or print server or computer does not have the proper access rights to print the document, then the user is notified that the document is not printable by the Print Document Pages module 610 through the User Interface module 608.

Figure 7:
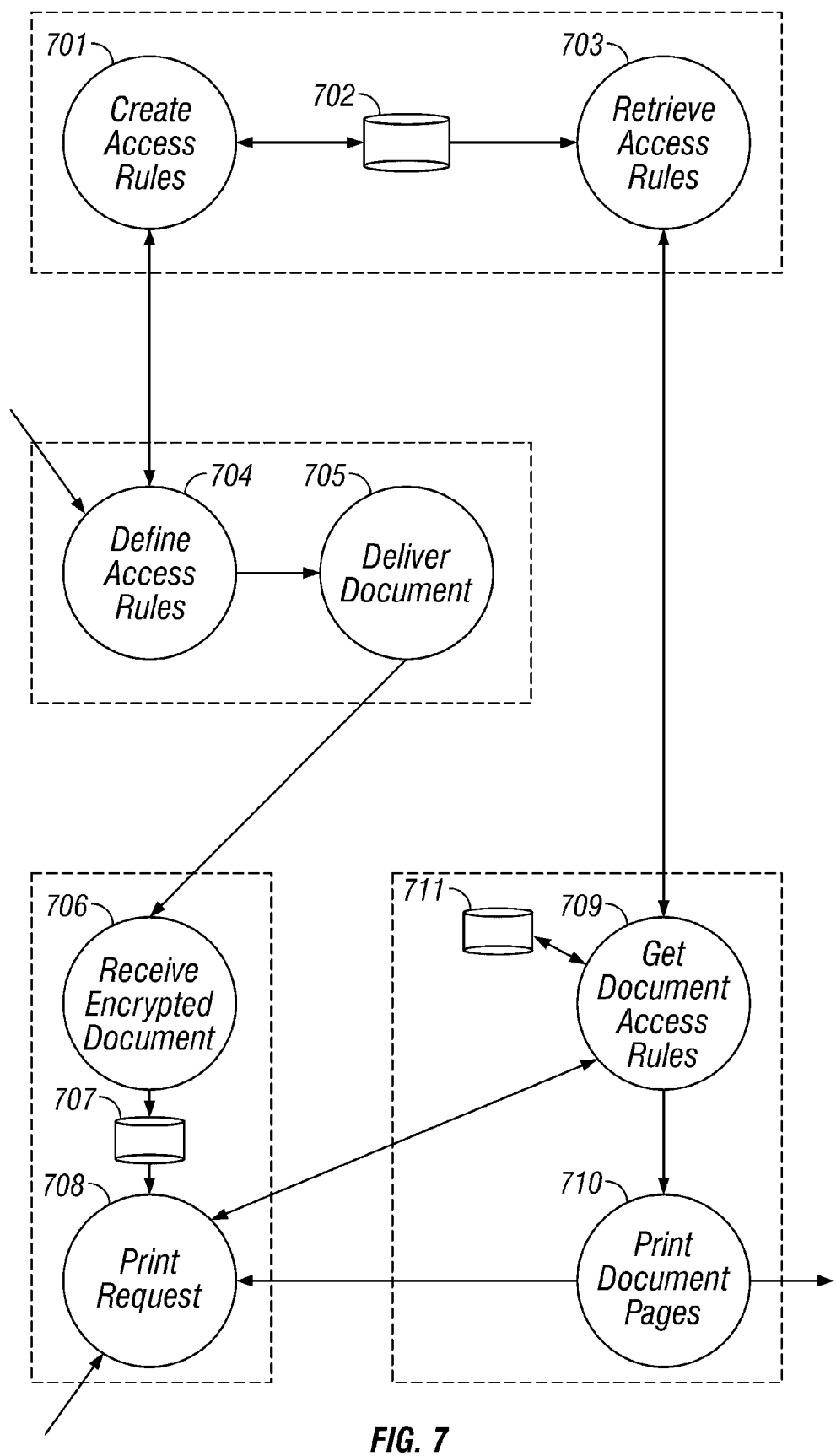
FIG. 7 is a block schematic diagram of a task viewpoint of a preferred embodiment of the invention showing the interactions between a policy server, print server, and receiving user's computer according to the invention.

Referring to FIG. 7, a task viewpoint of another preferred embodiment of the invention with a remote computer as the encrypted document receiver is shown. The user defines the access rules for a document through the Define Access Rules module 704. The Define Access Rules module 704 communicates with the Create Access Rules module 701 to create the access rules for the document. The Create Access Rules module 701 stores the document's access rules in its local storage 702. As described above, the access rules for the document can always be modified by the user through the Define Access Rules module 704 and the Create Access Rules module 701 for the life of the document.

When the user is ready to send the document to another user, the Deliver Document module 705 encrypts the document, inserts the policy server's name, IP address, or URL address into the document, and sends the package to the destination.

The Receive Encrypted Document module 706 or the email program on the receiving user's computer receives encrypted documents and places them in local storage 707 for later access and printing. The receiving user accesses the documents stored on his computer and requests the printing of the document through the Print Request module 708. The Print Request module 708 may be accessible through the receiving user's email program. The Print Request module 708 sends the print request to the Get Document Access Rules module 709 on a print server.

The Get Document Access Rules module 709 retrieves the encrypted document and user name or ID from the Print Request module 708 and stores the encrypted document on local storage 711. It then gathers the document ID, print server name or ID, and user name or ID and requests the access rules for the document from the Retrieve Access Rules module 703.

Access rules and the decryption key for the document are retrieved from local storage 702 by the Retrieve Access Rules module 703. The Retrieve Access Rules module 703 extracts the access rules for the receiving user and the print server, e.g. a print server may not be in the group of print servers that are allowed to print the document, and sends the access rules and decryption key to the Get Document Access Rules module 709.

The access rules, decryption key, and document (from the local storage 711) are sent to the Print Document Pages module 710 by the Get Document Access Rules module 709. The Print Document Pages module 710 prints the document based on the document or page-level access rule by sending the printable pages to a printer. If the user or print server does not have the proper access rights to print the document, then the user is notified that the document is not printable by the Print Document Pages module 710 through the Print Request module 708.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for securely transporting in a networked environment a document to be printed, the method comprising:
   providing a policy server;
      wherein a user defines a set of access rules for the document through the policy server;
      wherein the policy server stores the access rules and a decryption key for the document;
      wherein the access rules apply to any of: the entire document or individual pages of the document;
   providing a print server;
   providing document encryption means for encrypting the document;
      wherein the encryption means attaches the policy server's name, IP address, or URL address to the document;
   sending the encrypted document to a receiving user's computer;
      wherein the receiving user's computer stores the document locally;
   providing notification means for notifying a receiving user of the existence of the document on the receiving user's computer, and
   responsive to the receiving user requesting, at a later time than when said document was locally stored, the document be printed, the receiving user's computer retrieving the document from local storage, contacting the policy server, and requesting therefrom the set of access rules and the decryption key for the one document, wherein the policy server references the document, an identifier of the receiving user, and a computer ID of the user's computer to retrieve the decryption key and access rules for the document and wherein the policy server tracks which computers can print the document and which printer that the user's computer is connected to can print the document.

2. The method of claim 1, wherein the receiving user requests that the document be printed, and wherein the receiving user's computer sends a print request to the print server.

3. The method of claim 2, wherein the print server retrieves the encrypted document from the receiving user's computer, and wherein the print server requests the access rules for the receiving user and the print server and the decryption key for the document from the policy server named in the document.

4. The method of claim 3, wherein the policy server retrieves the document's access rules for the receiving user and print server and the document's decryption key from local storage and sends them to the print server.

5. The method of claim 4, further comprising:
   providing document decryption means on the print server for decrypting the document using the document's decryption key from the policy server;
   providing access rule evaluation means on the print server for evaluating the access rules for the document in relation to the receiving user and the print server; and
   wherein the access rule evaluation means sends the pages of the document that are printable by the receiving user and print server to a printer for printing.

6. The method of claim 5, further comprising providing notification means for notifying the receiving user if the document is not printable.

7. The method of claim 1, wherein the access rules apply to any of: an individual user and a group of users.

8. The method of claim 1, wherein the access rules specify the print servers that are allowed to print the document.

9. The method of claim 1, wherein the access rules define any of: the expiration date and the maximum number of prints.

10. The method of claim 1, wherein the access rules for the document are modifiable by the user through the life of the document.

11. Apparatus for securely transporting and printing a document in a networked environment a document to be printed, the apparatus comprising:
   a policy server;
      wherein a user defines a set of access rules for the document through the policy server;
      wherein the policy server stores the access rules and a decryption key for the document;
      wherein the access rules apply to any of: the entire document or individual pages of the document;
   a print server;
   document encryption means for encrypting the document;
      wherein the encryption means attaches the policy server's name, IP address, or URL address to the document;
   sending the encrypted document to a receiving user's computer;
      wherein the receiving user's computer stores the document locally;
   notification means for notifying a receiving user of the existence of the document on the receiving user's computer, and
   wherein, responsive to the receiving user requesting, at a later time than when said document was locally stored, the document be printed, the receiving user's computer retrieves the document from local storage, contacts the policy server, and requests therefrom the set of access rules and the decryption key for the one document, wherein the policy server references the document, an identifier of the receiving user, and a computer ID of the user's computer to retrieve the decryption key and access rules for the document and wherein the policy server tracks which computers can print the document and which printer that the user's computer is connected to can print the document.

12. The apparatus of claim 11, wherein the receiving user requests that the document be printed, and wherein the receiving user's computer sends a print request to the print server.

13. The apparatus of claim 12, wherein the print server retrieves the encrypted document from the receiving user's computer, and wherein the print server requests the access rules for the receiving user and the print server and the decryption key for the document from the policy server named in the document.

14. The apparatus of claim 13, wherein the policy server retrieves the document's access rules for the receiving user and print server and the document's decryption key from local storage and sends them to the print server.

15. The apparatus of claim 14, further comprising:
   document decryption means on the print server for decrypting the document using the document's decryption key from the policy server;
   access rule evaluation means on the print server for evaluating the access rules for the document in relation to the receiving user and the print server; and
   wherein the access rule evaluation means sends the pages of the document that are printable by the receiving user and print server to a printer for printing.

16. The apparatus of claim 15, further comprising providing notification means for notifying the receiving user if the document is not printable.

17. The apparatus of claim 11, wherein the access rules apply to any of: an individual user and a group of users.

18. The apparatus of claim 11, wherein the access rules specify the print servers that are allowed to print the document.

19. The apparatus of claim 11, wherein the access rules define any of: the expiration date and the maximum number of prints.

20. The apparatus of claim 11, wherein the access rules for the document are modifiable by the user through the life of the document.

* * * * *